(12) United States Patent
Wen

(10) Patent No.: US 7,837,092 B2
(45) Date of Patent: Nov. 23, 2010

(54) ELECTRONIC DEVICE AND AN EJECTION DEVICE FOR EJECTING A SEPARABLE DEVICE FROM THE ELECTRONIC DEVICE

(75) Inventor: Hung-Chuan Wen, Jhudong Township, Hsinchu County (TW)

(73) Assignee: Qisda Corporation, Taoyuan County (TW)

( * ) Notice: Subject to any disclaimer, the term of this patent is extended or adjusted under 35 U.S.C. 154(b) by 859 days.

(21) Appl. No.: 11/730,874

(22) Filed: Apr. 4, 2007

(65) Prior Publication Data
US 2007/0235538 A1    Oct. 11, 2007

(30) Foreign Application Priority Data
Apr. 6, 2006    (TW) ............... 95112159 A

(51) Int. Cl.
*G06F 17/00*  (2006.01)
*G06K 13/04*  (2006.01)
*G06K 13/06*  (2006.01)
*G06K 13/24*  (2006.01)
*G06K 7/00*   (2006.01)
*H01R 13/62*  (2006.01)

(52) U.S. Cl. .................. 235/375; 235/479; 235/483; 235/486; 439/159

(58) Field of Classification Search .......... 439/159, 439/558, 670.22; 455/558; 235/479, 483, 235/486, 375; 360/99.02, 99.06; 720/601, 720/613, 636, 653
See application file for complete search history.

(56) References Cited

U.S. PATENT DOCUMENTS

| | | | | |
|---|---|---|---|---|
| 3,809,826 A | * | 5/1974 | Rhodes ............ | 379/357.01 |
| 4,724,310 A | * | 2/1988 | Shimamura et al. ... | 235/483 |
| 5,145,389 A | * | 9/1992 | Okubo .............. | 439/159 |
| 5,257,414 A | * | 10/1993 | Trahan et al. ....... | 455/558 |
| 5,389,001 A | * | 2/1995 | Broschard et al. .... | 439/159 |
| 5,421,737 A | * | 6/1995 | Chen et al. ......... | 439/157 |
| 5,470,241 A | * | 11/1995 | Kaufman et al. ...... | 439/159 |
| 5,485,330 A | * | 1/1996 | Hirose et al. ....... | 360/99.06 |
| 5,499,925 A | * | 3/1996 | Lwee ................ | 439/157 |
| 5,507,658 A | * | 4/1996 | Ho .................. | 439/159 |
| 5,655,917 A | * | 8/1997 | Kaneshige et al. .... | 439/155 |
| 5,667,396 A | * | 9/1997 | Pan et al. .......... | 439/160 |
| 5,906,516 A | * | 5/1999 | Sato et al. ......... | 439/630 |
| 5,967,812 A | * | 10/1999 | Tung et al. ......... | 439/159 |
| 5,997,323 A | * | 12/1999 | Youn ................ | 439/159 |
| RE36,511 E | * | 1/2000 | Liou et al. ......... | 720/609 |
| 6,035,216 A | * | 3/2000 | Cheng et al. ........ | 455/558 |
| 6,210,188 B1 | * | 4/2001 | Chang ............... | 439/159 |
| 6,247,946 B1 | * | 6/2001 | Nakamura et al. ..... | 439/159 |
| RE37,265 E | * | 7/2001 | Lwee ................ | 439/157 |

(Continued)

*Primary Examiner*—Daniel Walsh

(57) ABSTRACT

An electronic device and an ejection device for ejecting a separable device from the electronic device are provided. The ejection device includes a first arm, a second arm, a tray, and a tray guide. The first arm includes a pivot. The second arm is fixed on the first arm such that an angle is formed therebetween. The tray includes a base plate which has a second arm guiding element extending in a first direction on its bottom surface. The tray is movably connected to the tray guide such that the tray is movable in a second direction. When the first arm rotates relative the pivot, the first arm also compels the second arm to rotate about the pivot. In the meantime, the second arm moves along the second arm guiding element to drive the tray moving along the second direction.

17 Claims, 9 Drawing Sheets

U.S. PATENT DOCUMENTS

| | | | |
|---|---|---|---|
| 6,814,597 B1* | 11/2004 | Kao | 439/159 |
| 6,991,170 B2* | 1/2006 | Hirasawa et al. | 235/479 |
| 7,011,537 B1* | 3/2006 | Wu | 439/159 |
| 7,073,183 B2* | 7/2006 | Hekizono | 720/610 |
| 7,354,285 B1* | 4/2008 | Lin | 439/160 |
| 7,458,857 B2* | 12/2008 | Lin et al. | 439/630 |
| 2001/0046799 A1* | 11/2001 | Cho | 439/159 |
| 2002/0160661 A1* | 10/2002 | Florescu | 439/630 |
| 2004/0077198 A1* | 4/2004 | Schlack | 439/160 |
| 2004/0094629 A1* | 5/2004 | Hirasawa et al. | 235/479 |
| 2004/0248445 A1* | 12/2004 | Lai et al. | 439/159 |
| 2005/0034138 A1* | 2/2005 | Yong | 720/609 |
| 2005/0083603 A1* | 4/2005 | Kanada et al. | 360/99.06 |
| 2005/0095886 A1* | 5/2005 | Nakamura | 439/157 |
| 2005/0136712 A1* | 6/2005 | Katayanagi et al. | 439/139 |
| 2005/0191970 A1* | 9/2005 | Hasegawa | 455/90.3 |
| 2006/0211288 A1* | 9/2006 | Ishii | 439/159 |
| 2006/0231619 A1* | 10/2006 | Lee | 235/441 |
| 2006/0234536 A1* | 10/2006 | Kuan et al. | 439/159 |
| 2008/0064239 A1* | 3/2008 | Li | 439/152 |
| 2008/0081677 A1* | 4/2008 | Lai | 455/575.1 |

\* cited by examiner

ELECTRONIC DEVICE AND AN EJECTION DEVICE FOR EJECTING A SEPARABLE DEVICE FROM THE ELECTRONIC DEVICE

This application claims benefit to a Taiwanese Patent Application No. 095112159 filed on Apr. 6, 2006.

BACKGROUND OF THE INVENTION

1. Field of the Invention

The present invention generally relates to an electronic device and an ejection device disposing on the electronic device; particularly, the present invention relates to an electronic device and an ejection device for ejecting a separable device from the electronic device.

2. Description of the Prior Art

With the vast and rising development in the electronic technology, the complexities as well as the precision in the designs of electronic devices grow day by day. At the same time, the amount of data that electronic devices can process is largely increasing also. Today, electronic devices such as computers, cellular phones, Personal Digital Assistant (PDA), etc. have become the very important tools one must have, whether they are used at work, at school, or at home. While the world has "digitized" because people are working so closely with electronic devices everyday, the amount of data storages becomes an important issue nowadays, and the electronic devices have advanced to cope with this issue. For instance, in addition to the built-in memory storage, many electronic devices now are compatible with external memory media. Another example is the progress development of the image/motion pictures recording media. The video unit in the earlier days reads in the recorded images/moving pictures from video tapes. The old-fashion video tape have certain drawbacks, such as having a big size, tendency to become worn out after many times of playing and recording, and also its limited recording time (usually about two hours maximum). Today, video tapes may be replaced by Digital Video Disc (DVD) and Video Compact Disc (VCD), which are small in size, not easy to wear out, and, one important advantage, provide a much longer recording time.

Today, many cellular phones, digital cameras, Personal Digital Assistant (PDA), as well as other electronic devices are compatible with external memory devices. Most of these electronic devices provide a slot for inserting a separable memory device, allowing the built-in memory to be largely reduced by the use of the external memory. Due to the reduction in the built-in memory, the processor loading of the electronic device can be decreased subsequently, hence accelerate the efficiency of the device. Furthermore, the manufacturers can lower their production costs on the electronic devices having a smaller built-in memory.

Since there are variety types of separable memory cards that come in different storage sizes, the users can choose memory cards with the desired storage sizes. Therefore, the amount of data that the electronic devices process can increase at the same time. However, when a user wants to switch the separable memory card at use to a different one, he needs to remove the current memory card inside the electronic device before inserting the other memory card into the device.

Currently, the common way of removing a memory card from an electronic device is by hand operation or a spring unit. In the method of using a spring unit, a sprint unit and a constraint device for constraining the spring are disposed on the bottom of a slot, which disposes on the electronic device. To remove the memory card, the user can simply pushes the memory downward toward the bottom the slot, which releases the restriction on the spring unit from the constraint device. Once the spring unit is free from the restriction, it will push the memory card out of the slot. In the hand operation method, there is a groove disposing on the top end of a slot, which disposes on the electronic device. To remove the memory card, the user can simply pull the memory card out of the slot from the groove.

Generally, in order to protect the memory card slot, a protection cap is usually provided to cover the slot on an electronic device. However, when using an electronic device having a protection cap, sometimes it is very troublesome for the users to open and close the protection cap each time when they want to remove the memory card from the slot. This problem is resolved by the present invention, which provides an ejection device having a much more convenient operating method.

SUMMARY OF THE INVENTION

It is a primary object of the present invention to provide an ejection device disposing on an electronic device, in which the ejection device ejects a separable device from the electronic device.

It is another object of the present invention to provide an ejection device disposing on an electronic device, in which the ejection device has an easy and convenient operating method.

It is another object of the present invention to provide an ejection device disposing on an electronic device, in which the ejection device protects and covers a separable device.

It is another object of the present invention to provide an electronic device comprising an ejection device, in which the electronic device provides a function of ejecting a separable device.

It is another object of the present invention to provide an electronic device comprising an ejection device, in which the electronic device and the ejection device are easy to assemble.

The electronic device of the present invention mainly comprises a housing and an ejection device, in which the ejection device ejects a separable device from the electronic device.

The ejection device mainly comprises a first arm, a second arm, a tray, and a tray guide. The first arm has a pivot, and the first arm is rotatable relative to the pivot. The second arm is fixed on the first arm such that an angle is formed therebetween. When the first arm rotates relative to the pivot, the second arm also rotates along with the first arm, relative to the pivot. The tray comprises a base plate, in which the base plate includes a second arm guiding element extending in a first direction. The second arm has a guiding portion that corresponds to the second arm guiding element. The second arm guiding element is movably connected to the guiding portion, which enable the second arm to move relatively with the tray. Furthermore, the tray is restricted to move in a second direction that intersects the first direction at an angle. The tray is movably connected to the tray guide such that the tray is movable in the second direction.

In the preferred embodiment, the housing has a first wall and a second wall that intersects with the first wall at an angle. Furthermore, a slot is formed on the second wall. The first arm is rotatably disposed on the first wall. It is rotatable relative to the pivot, and it forms a cover for shutting the slot. One end of the tray corresponds to the slot. By the movement of the tray in the second direction, one end of the tray can exit or enter the housing through the slot.

As the first arm rotates relative to the pivot, the second arm also rotates. At this moment, the guiding portion will start sliding along the second arm guiding element, and simultaneously pushes the tray toward the slot out of the housing in the second direction. When part of the tray is exposed outside the housing, the user can place the separable device on the tray, or remove the separable device from the tray.

BRIEF DESCRIPTION OF THE DRAWINGS

FIG. 3 is an exploded view of the ejection device in FIG. 2a;

DETAILED DESCRIPTION OF THE PREFERRED EMBODIMENT

Figure 1:
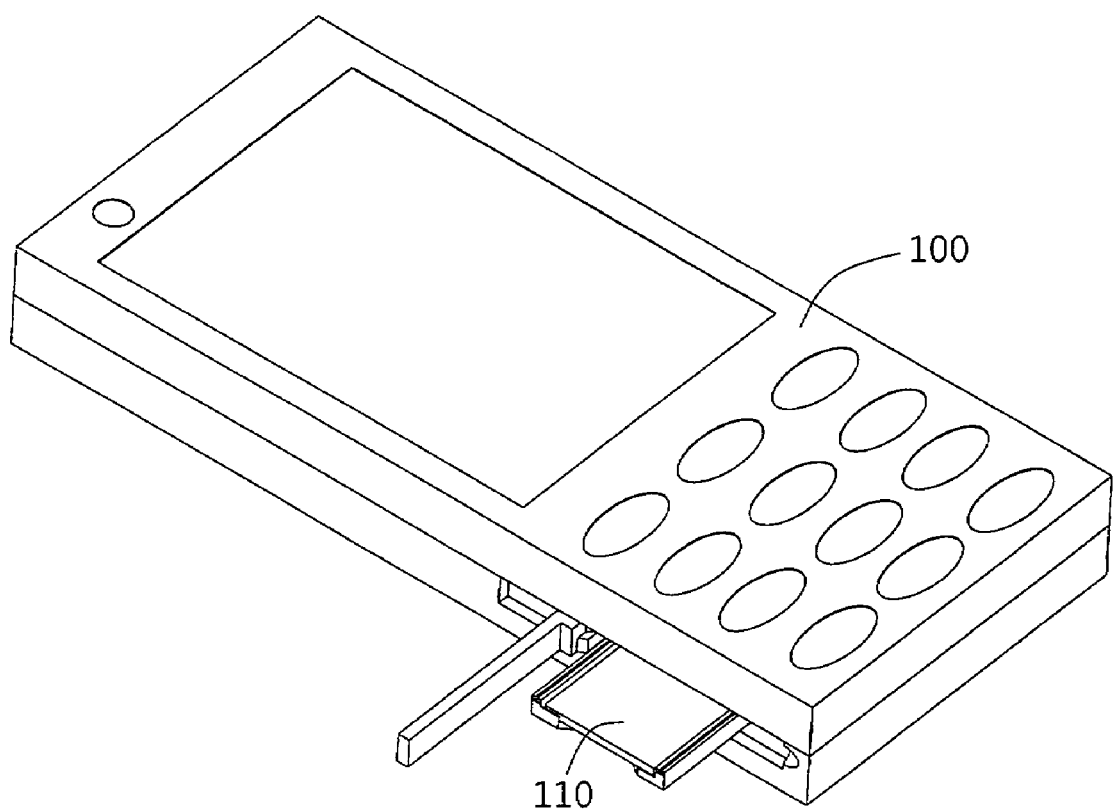
FIG. 1 shows an embodiment of the electronic device using the separable device of the present invention.

The present invention provides an ejection device disposing on an electronic device 100 for ejecting a separable device 110 from the electronic device 100. In the preferred embodiment shown in FIG. 1, the electronic device 100 includes a cellular phone, and the separable device 110 includes a flash memory card that can be used in the cellular phone. In a different embodiment, however, the electronic device 100 may include a digital camera, a Personal Digital Assistant (PDA), or other type of electronic devices. The separable device 110 may include a different type of memory cards, recording media, or other interface device.

Figure 2A:
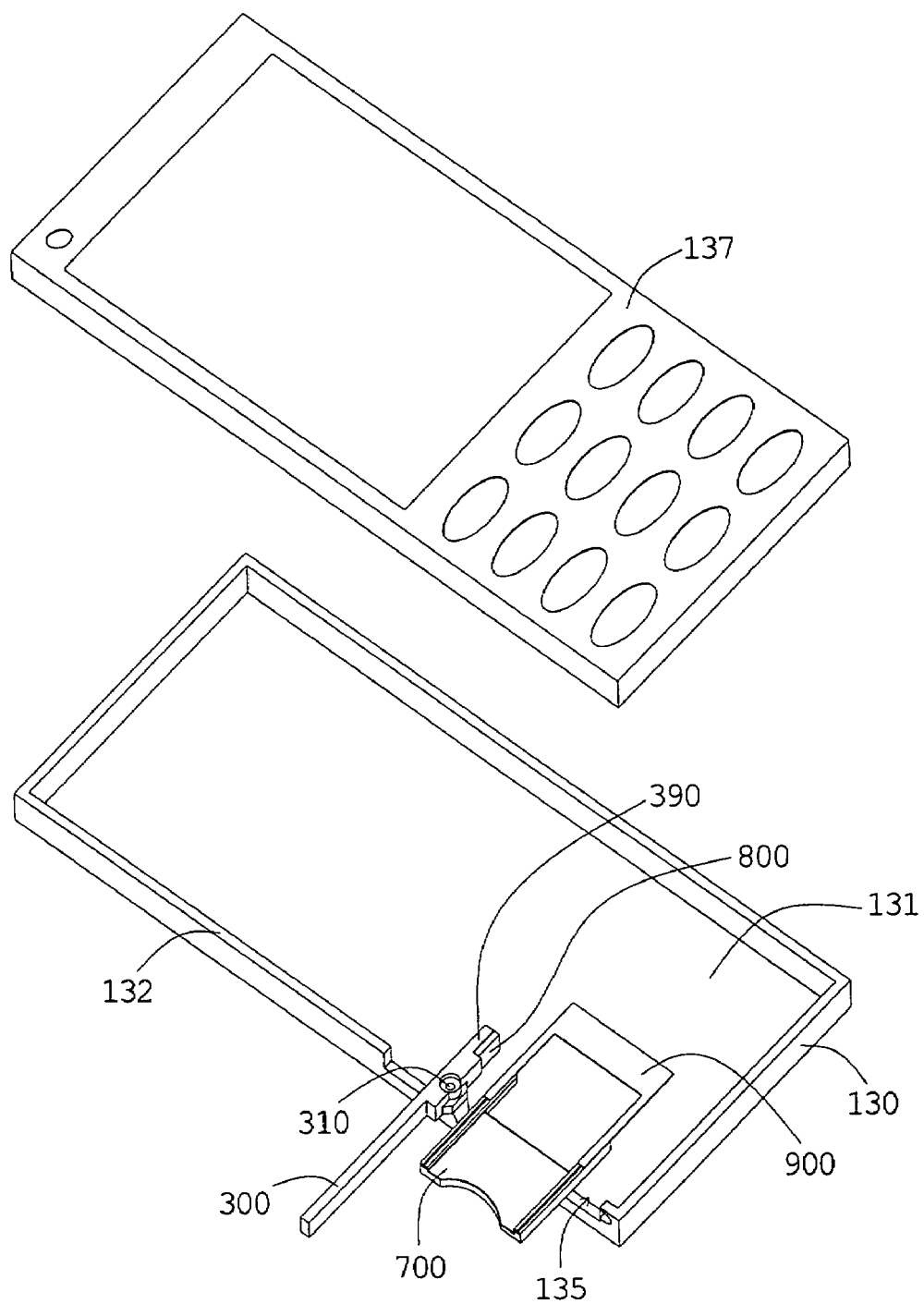
FIG. 2a is a perspective view showing an embodiment of the ejection device when it is opened.

In the preferred embodiment shown in FIG. 2a, the electronic device 100 comprises a housing 130 and an ejection device. The housing 130 has a first wall 131 and a second wall 132, wherein the first wall 131 intersects with the second wall 132 at an angle. Furthermore, there is a slot 135 formed on the second wall 132. In this preferred embodiment, the first wall 131 is the bottom face of the housing 130, and the second wall 132 is the side face that connects with this bottom face. However, in a different embodiment, the first wall 131 can be the top face or the side face of the housing 130.

The ejection device comprises a first arm 300, a second arm 500, a tray 700, and a tray guide 900. In the preferred embodiment shown in FIG. 3, the first arm 300 has a pivot 310, a covering arm 320, and a protruding arm 390. The covering arm 320 and the protruding arm 390 are connected to each other and are rotatable relative to the pivot 310. In this embodiment, the pivot 310 is disposed between the covering arm 320 and the protruding arm 390 and located on the inner side of the side face of the first arm 300 and near one end of the first arm 300.

Figure 2B:
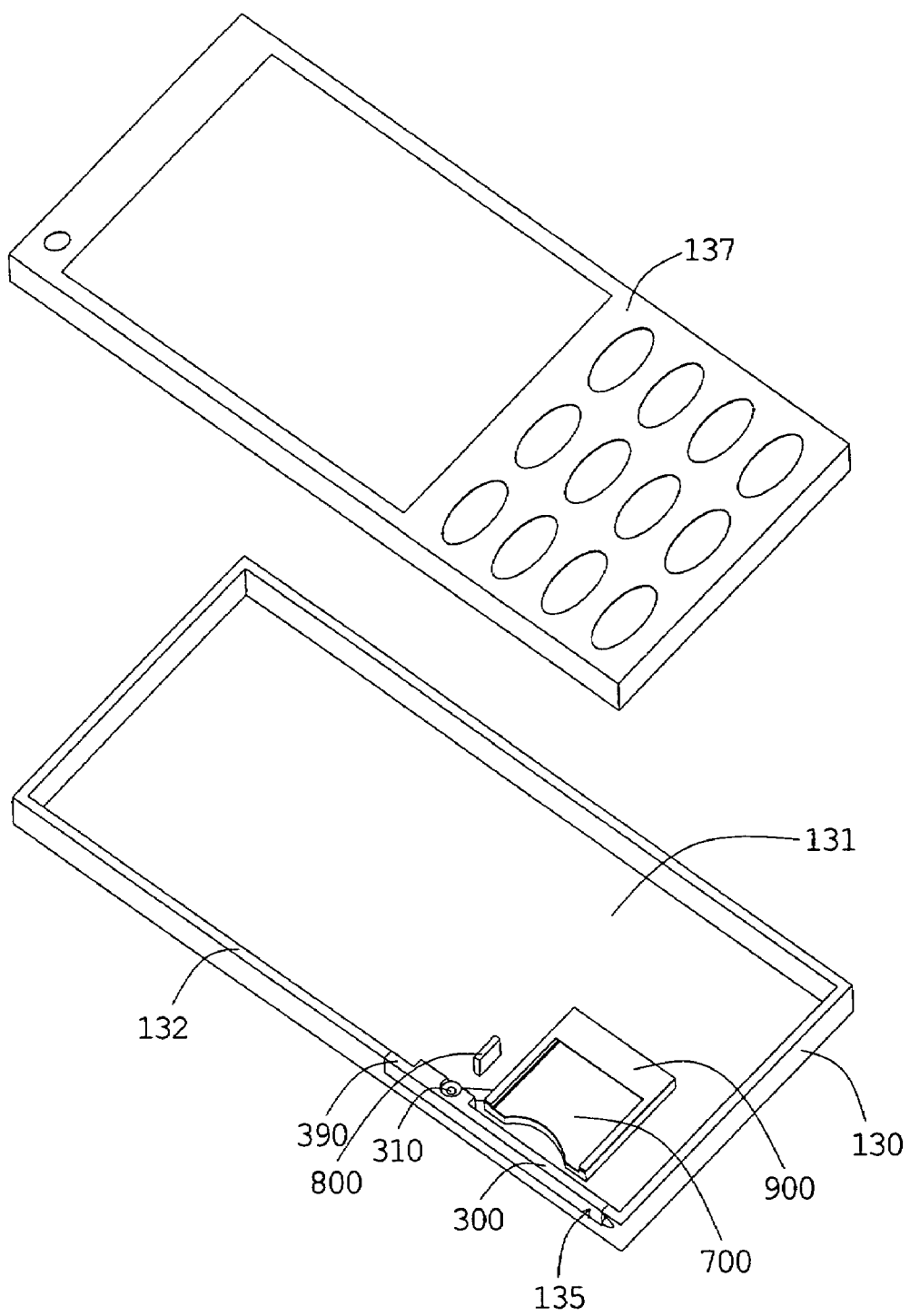
FIG. 2b is a perspective view showing an embodiment of the ejection device when it is closed.
Figure 3:
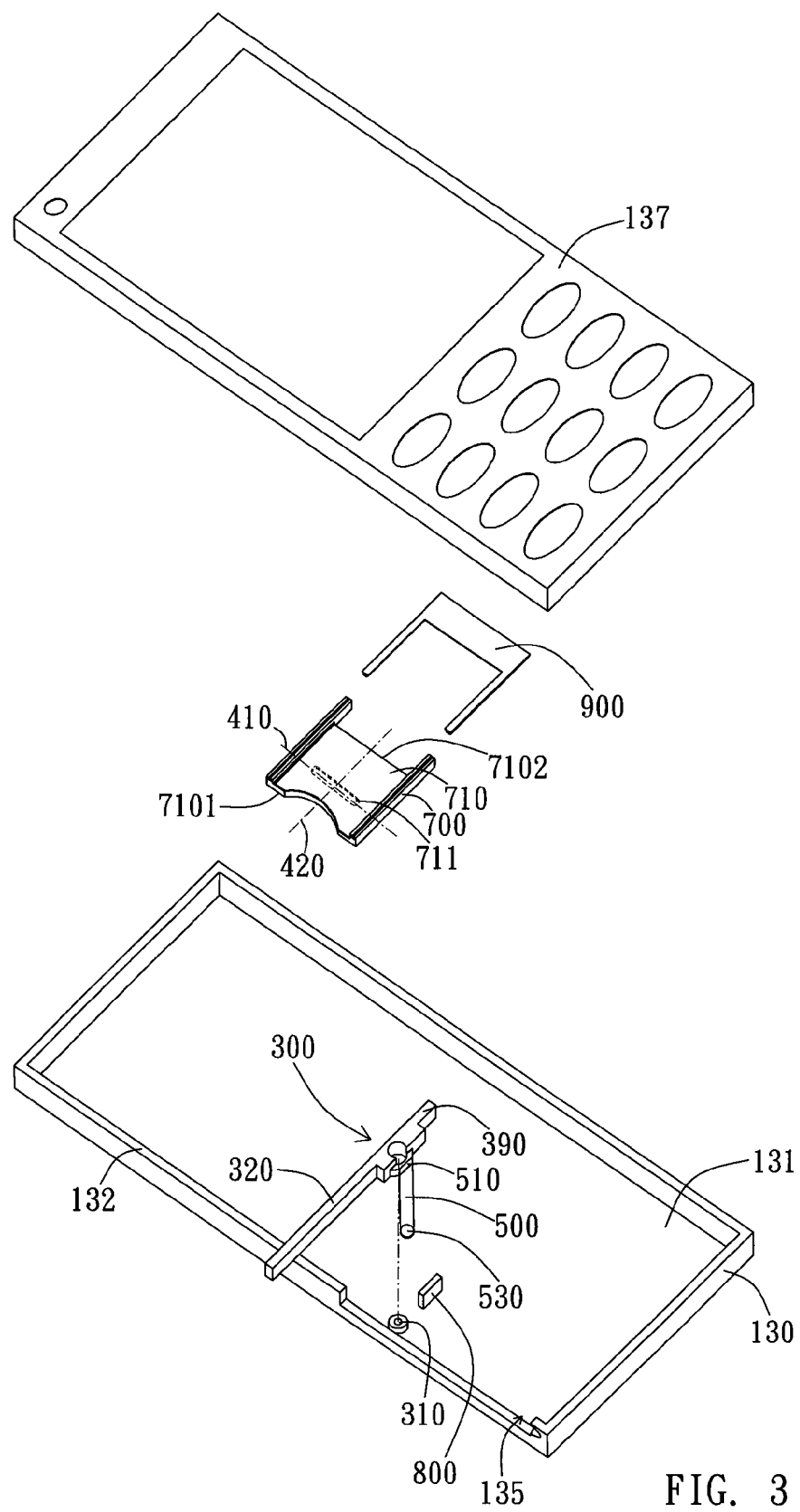

In the preferred embodiments shown in FIG. 2a and FIG. 3, the first arm 300 is rotatably disposed on the housing 130 and is rotatable relative to the pivot 310. It is preferably to be disposed on the first wall 131. Furthermore, as shown in FIG. 2b, the first arm 300 can form a cover corresponding to the slot 135 for shutting the slot.

As shown in FIG. 3, the second arm 500 is fixed on the first arm 300 such that an angle is formed therebetween. When the first arm 300 rotates relative to the pivot 310, the second arm 500 will also rotates along with the first arm 300, relative to the pivot 310. In the preferred embodiment shown in FIG. 3, an end 510 of the second arm 500 connects with the first arm 300, and the location of the end 510 corresponds to the pivot 310. Furthermore, the pivot 310 can be disposed on the housing 130 directly so that the first arm 300 can rotatably engages with it.

Figure 4:
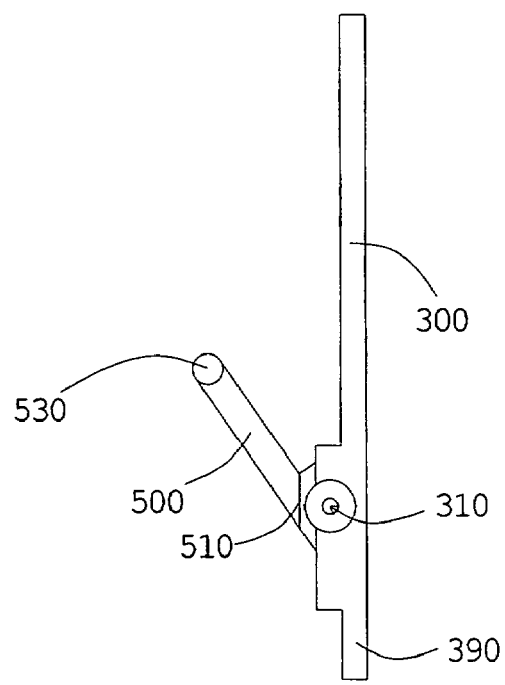
FIG. 4 is a top view showing an embodiment of the first arm and the second arm.

In the preferred embodiment, the first arm 300 and the second arm 500 intersect at an angle. As shown in FIG. 4, the angle formed between the first arm 300 and the second arm 500 is less than 90 degree. Furthermore, the preferred value of this angle is usually between 15 degree and 75 degree.

Figure 5:
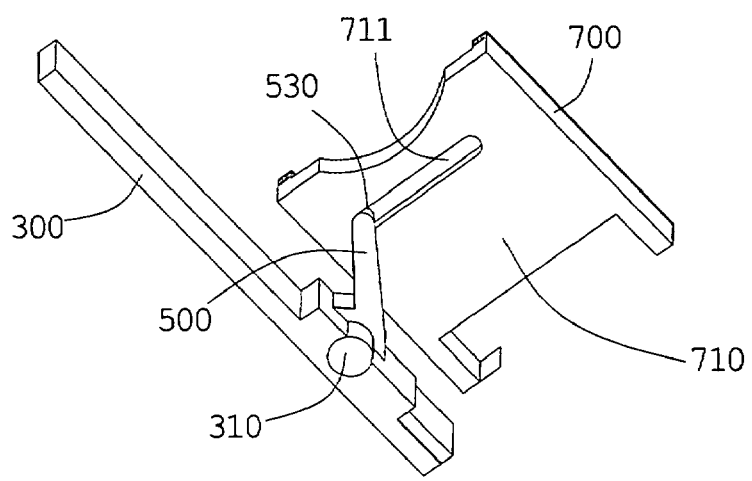
FIG. 5 is an assembled view showing the first arm, the second arm, and the tray.

In the present invention, the tray 700 is utilized for holding the separable device 110. As shown in FIG. 3, the tray 700 comprises a base plate 710. The base plate 710 has a first edge 7101 and a second edge 7102 both extending in the first direction 410. The first edge 7101 can be selectively moved outward of the slot 135. The bottom face of the base plate 710 includes a second arm guiding element 711 extending in a first direction 410. The second arm guiding element 711 is located between the first edge 7101 and the second edge 7102. The second arm 500 has a guiding portion 530 that corresponds to the second arm guiding element 711. Furthermore, the guiding portion 530 is movably connected to the second arm guiding element 711. This can cause the second arm 500 to move relative to the tray 700. In the preferred embodiment as shown in FIG. 5, the second arm guiding element 711 is a groove disposing on the base plate 710, and the guiding portion 530 is a protrusion locating on one end of the second arm 500. The protrusion is movably engaged with the groove, causing any movement of the second arm 500 to produce a relative movement of the tray 700.

As shown in FIG. 3, one end of the tray 700 corresponds to the slot 135. Furthermore, the tray 700 is restricted to move in a second direction 420. By the movement in the second direction 420, one end of the tray 700 is able to exit or enter the housing 130 through the slot 135. As shown in FIG. 3, the second direction 420 is perpendicular to the first direction 410. However, in a different embodiment, the second direction 420 and the first direction 410 can intersect at a different angle.

Figure 6:
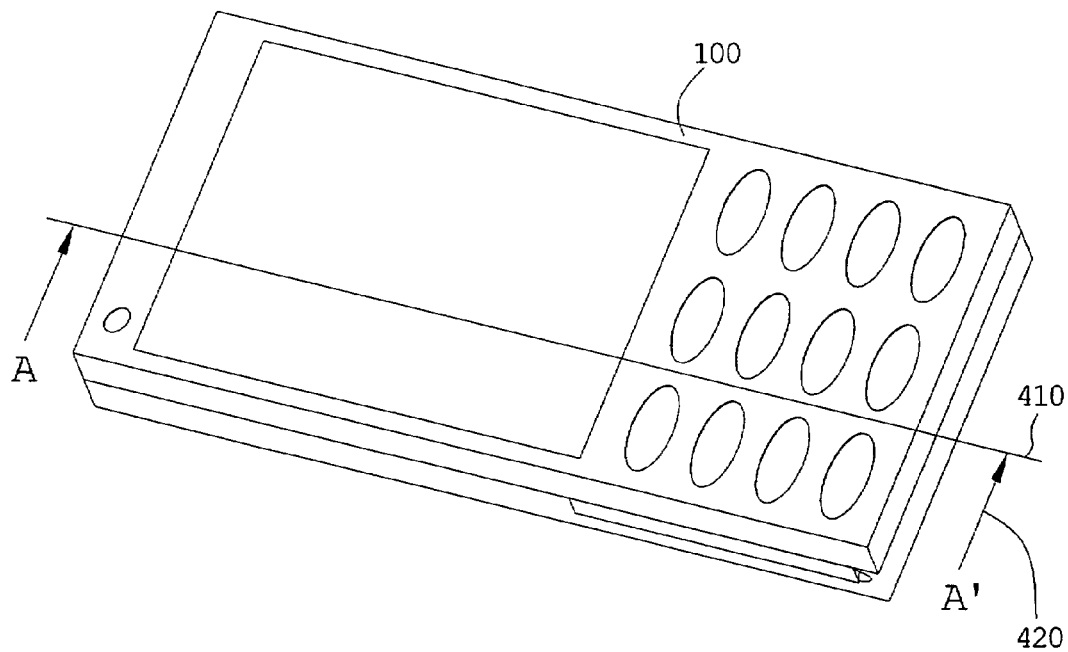
FIG. 6 is a cross-sectional view of the electronic device and the ejection device in FIG. 2b.
Figure 6:
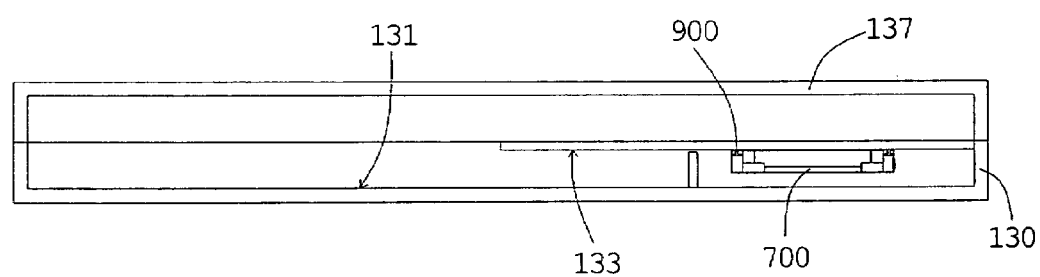

As shown in FIG. 6, the housing 130 comprises a third wall 133 opposite to the first wall 131, and the third wall 133 is disposed on a top shell 137 of the housing 130. In the preferred embodiment, the tray 700 is movably disposed on the third wall 133 and is movable in the second direction 420. However, in a different embodiment, the tray 700 can be disposed on the first wall 131.

Figure 7:
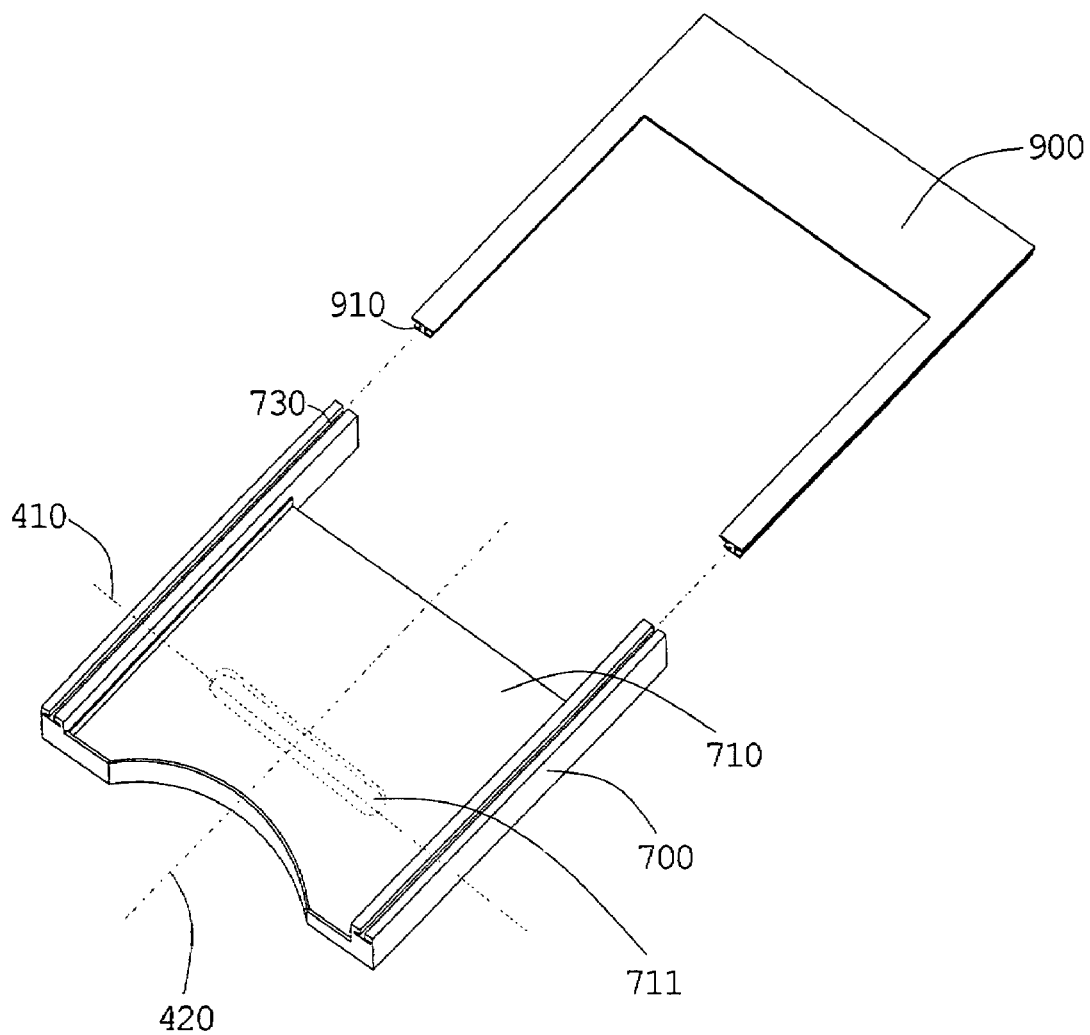
FIG. 7 is a perspective view of the tray and the tray guide.

In the preferred embodiment, the tray 700 is movably connected to the tray guide 900 such that the tray 700 is movable in the second direction 420 only. As shown in FIG. 7, the tray guide 900 is preferred to include a pair of guiding track 910, and a pair of fillister 730 is locating on the two sides of tray 700, corresponding to the guiding track 910. When the pair of the guiding track 910 is movably engaged with the corresponding pair of the fillister 730, the tray 700 can move relative to the tray guide 900 in the second direction 420.

As shown in FIG. 6, the tray guide 900 is preferred to connect with the third wall 133 of the top shell 137 of the housing 130, in order to secure the relative placement of the tray guide 900 on the housing 130. Such connection may be achieved by engaging, gluing, inlaying, or other method that provides the similar result. However, in a different embodiment, the tray guide 900 can connect with the first wall 131 of the housing 130, in order to secure the relative placement of the tray guide 900 on the housing 130.

As shown in FIG. 2a and FIG. 2b, the ejection device further includes a blockage device 800, which is preferred to be disposed on the first wall 131. However, in a different embodiment, the blockage device 800 can be disposed on the third wall 133. A protruding arm 390 is formed on one end of the first arm 300. When the first arm 300 rotates relative to the pivot 310 to a certain position, the blockage device 800 is able to stop the protruding arm 390 from rotating. In the preferred embodiment, when the first arm 300 rotates to the position where a 90 angle is formed between the first arm 300 and the second wall 132, the blockage device 800 stops the protruding arm 390 from rotating.

Figure 8A:
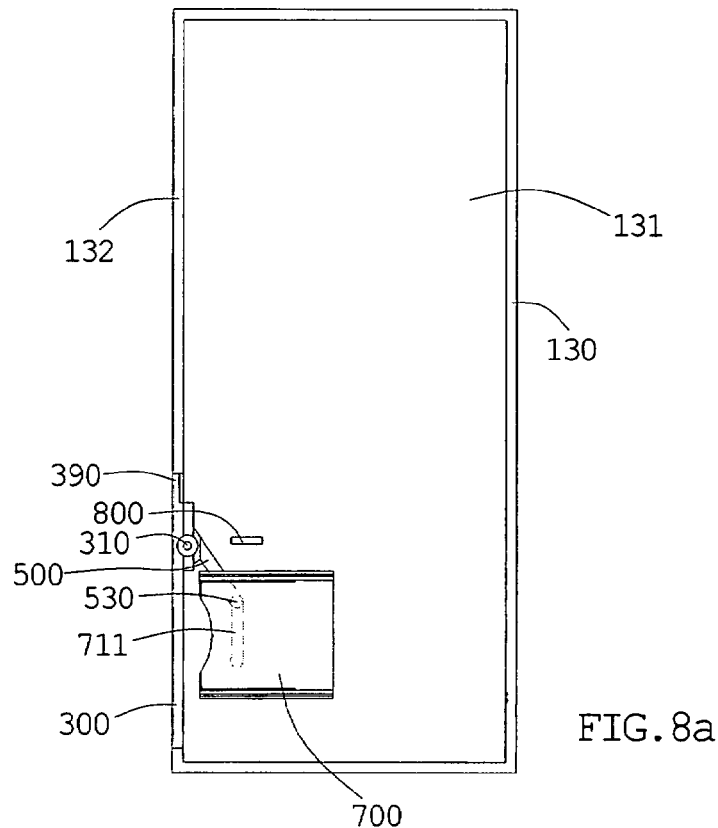
FIGS. 8a, 8b, and 8c are motion views of the ejection device.
Figure 8B:
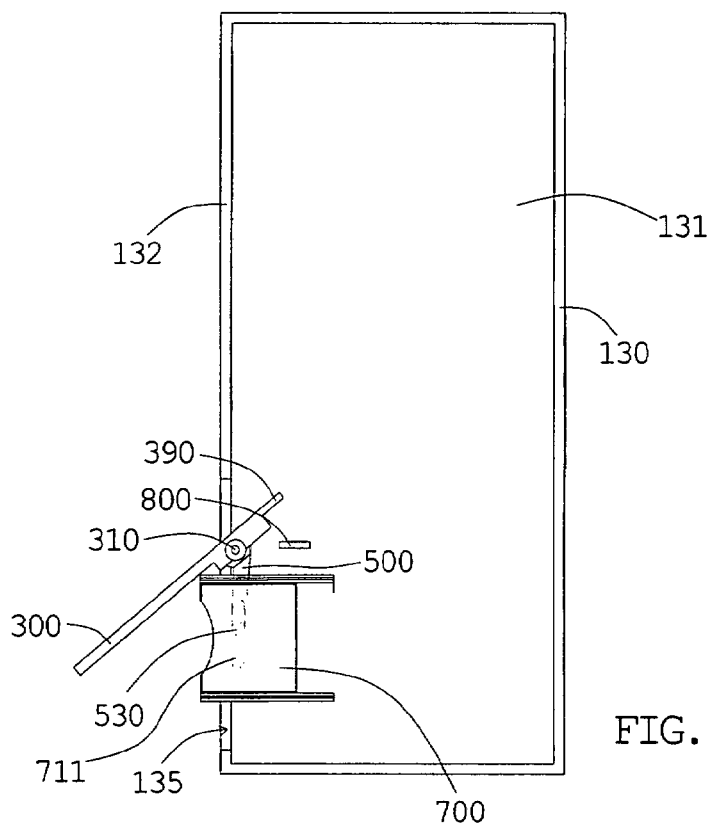
Figure 8C:
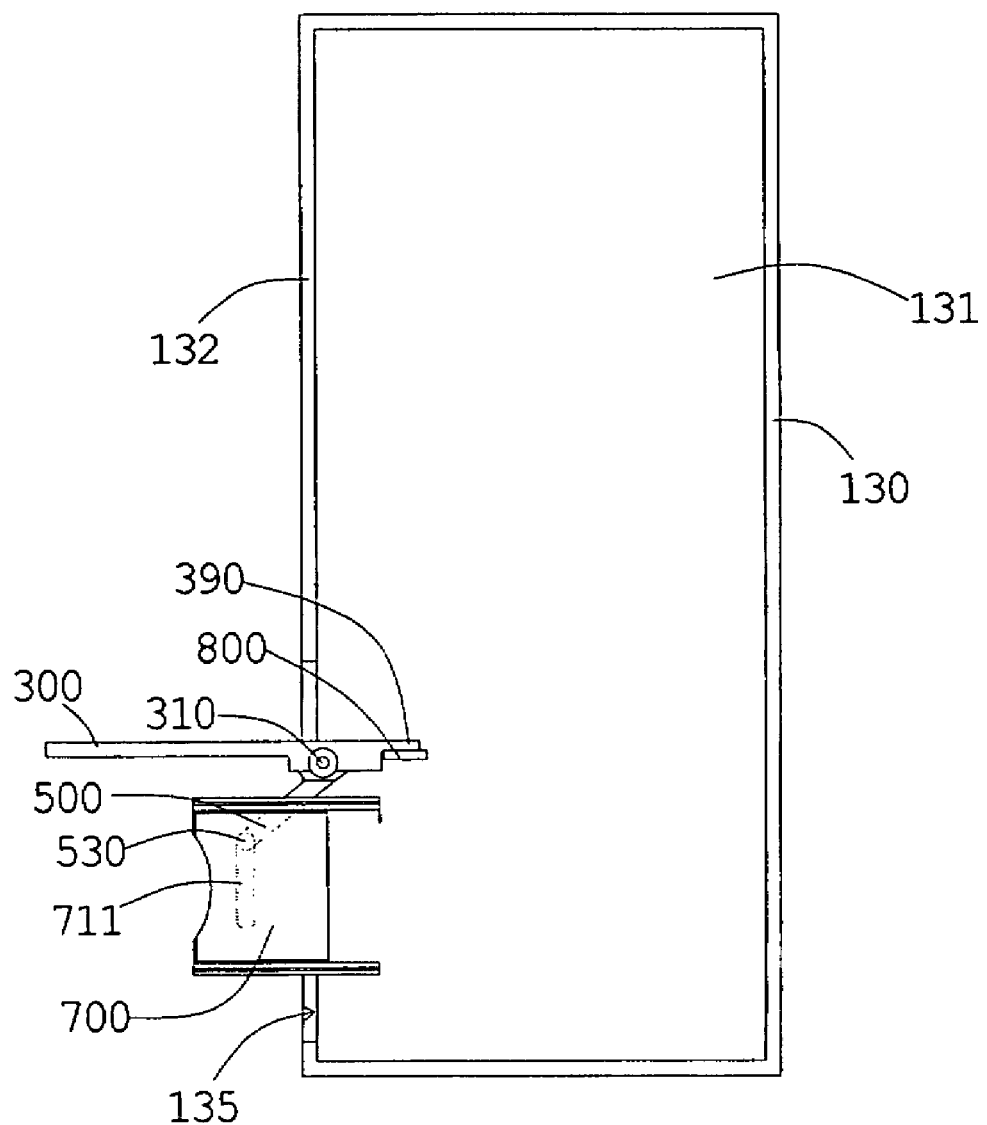

FIG. 8a, FIG. 8b, and FIG. 8c illustrate the relative movements of the first arm 300, the second arm 500, and the tray 700. FIG. 8a shows the condition when the tray 700 is retrieved into the housing 130. In this situation, the first arm 300 forms a cover and shuts the slot 135. The guiding portion 530 of the second arm 500 engages with one end of the second arm guiding element 711 of the tray 700. When the first arm 300 rotates relative to the pivot 310, as shown in FIG. 8b, the second arm 500 will also rotates. At this time, the guiding portion 530 will start sliding along the second arm guiding element 711, which, as a result, pushes the tray 700 toward the slot 135 out of the housing 130 in the second direction 420. When the first arm 300 rotates until the point where the blockage device 800 stops the protruding arm 390 from rotating, as shown in FIG. 8c, the guiding portion 530 will return to the original position where the initial sliding along the second arm guiding element 711 occurs. Furthermore, part of the tray 700 is exposed outside the housing 130. As a result, at this moment, the user can place the separable device 110 onto the tray 700, or remove the separable device 110 from the tray 700.

In other words, as shown from FIG. 8a to FIG. 8b, the operation of the ejection device is achieved by producing the relative movement of the second arm 500 by the movement of the first arm 300. The displacement of the second arm 500 can be broken down into two components in two directions. One is in the first direction 410, and the other is in the second direction 420. The displacement component in the first direction 410 is absorbed by the second arm guiding element 711 of the tray 700; therefore, the tray 700 can not move in the first direction. On the contrary, the displacement component in the second direction 420 pushes the tray 700 toward the slot 135 out of the housing 130 in the second direction 420.

Although the preferred embodiments of the present invention have been described herein, the above description is merely illustrative. Further modification of the invention herein disclosed will occur to those skilled in the respective arts and all such modifications are deemed to be within the scope of the invention as defined by the appended claims.

I claim:

1. An ejection device, disposed on an electronic device, for ejecting a separable device from the electronic device, the ejection device comprising:
    a first arm comprising a pivot, the first arm being rotatable relative to the pivot;
    a second arm having a guiding portion, the second arm being fixed on the first arm such that a fixed angle is formed therebetween, wherein the second arm moves with the movement of the first arm;
    a tray for carrying the separable device, the tray having a base plate, the base plate comprising a second arm guiding element extending in a first direction, the second arm guiding element movably connected to the guiding portion, wherein when the first arm moves, the guiding portion of the second arm moves between a first position and a second position along the second arm guiding element correspondingly; and
    a tray guide, the tray being movably connected to the tray guide such that the tray is movable in a second direction.

2. The ejection device according to claim 1, wherein the second arm and the first arm forms the fixed angle at the pivot.

3. The ejection device according to claim 1, wherein the guiding portion is a protrusion located on one end of the second arm, when the second arm rotates, the protrusion movably engages with the second arm guiding element along the first direction.

4. The ejection device according to claim 3, the electronic device having a slot, wherein the tray is movable outward of the slot along the second direction, the first direction being perpendicular to the second direction.

5. The ejection device according to claim 4, wherein the second arm guiding element is an engagement groove for engaging with the protrusion along the first direction.

6. The ejection device according to claim 4, wherein the first arm forms a cover for selectively covering the slot of the electronic device.

7. The ejection device according to claim 1, further comprising a blockage device, wherein the first arm has a covering arm and a protruding arm with the pivot located therebetween, wherein when the first arm rotates relative to the pivot, the blockage device is able to stop the protruding arm from rotating.

8. The ejection device according to claim 1, wherein the base plate has a first edge and a second edge with the second arm guiding element located therebetween, the first edge and the second edge both extending in the first direction.

9. An electronic device, comprising:
    a housing having a slot;
    a pivot located at the housing;
    a first arm;
    a second arm having a guiding portion, the first arm connecting the second arm and forming a fixed angle, the first arm and the second arm being rotatable relative to the pivot;
    a tray having a base plate with a second arm guiding element extending in a first direction; and
    a tray guide, wherein when the guiding portion engages with the second arm guiding element and moves from a first position to a second position along the first direction, the tray guide guides the tray to move outward of the slot along a second direction.

10. The electronic device according to claim 9, wherein the guiding portion is a protrusion located on one end of the second arm, when the second arm moves, the protrusion movably engages with the second arm guiding element along the first direction.

11. The electronic device according to claim 9, wherein the first arm forms a cover for selectively covering the slot of the housing.

12. The electronic device according to claim 9, wherein the first arm has a covering arm and a protruding arm with the pivot located therebetween, and the electronic device further comprises a blockage device disposed on the housing, wherein when the first arm rotates relative to the pivot, the blockage device is able to stop the protruding arm from rotating.

13. The electronic device according to claim 9, wherein the first direction is perpendicular to the second direction.

14. The electronic device according to claim 9, wherein the housing includes a first wall and a second wall, the slot is formed on the second wall, the first wall intersects with the second wall at an angle, the pivot is fixed on the first wall, the first arm and the second arm are rotatably disposed on the first wall.

15. An electronic device for ejecting a separable device, comprising:
   a housing having a slot;
   a plate for carrying the separable device, comprising a plate guiding element, a first edge, and a second edge, both the first edge and the second edge extending in a first direction, wherein the plate guiding element is located between the first edge and the second edge and is near the first edge, the first edge selectively moves outward of the slot;
   a pivot located on an inner wall of the housing;
   a first arm;
   a second arm having a guiding portion, the first arm connecting the second arm and forming a fixed angle, the first arm and the second arm being rotatable relative to the pivot; and
   a tray guide, wherein when the guiding portion engages with the plate guiding element and moves from a first position to a second position along the first direction, the tray guide guides the plate to move outward of the slot along a second direction perpendicular to the first direction.

16. The electronic device according to claim 15, wherein the housing includes a first wall and a second wall, the slot is formed on the second wall, the first wall intersects with the second wall at an angle, the pivot is fixed on the first wall, the first arm and the second arm are rotatably disposed on the first wall.

17. The electronic device according to claim 16, wherein the second arm is located between the second wall and the plate.

* * * * *